W. D. FORSYTH.
METHOD OF MAKING CAR PARTS.
APPLICATION FILED JUNE 1, 1914.
1,125,296.
Patented Jan. 19, 1915.
6 SHEETS—SHEET 1.
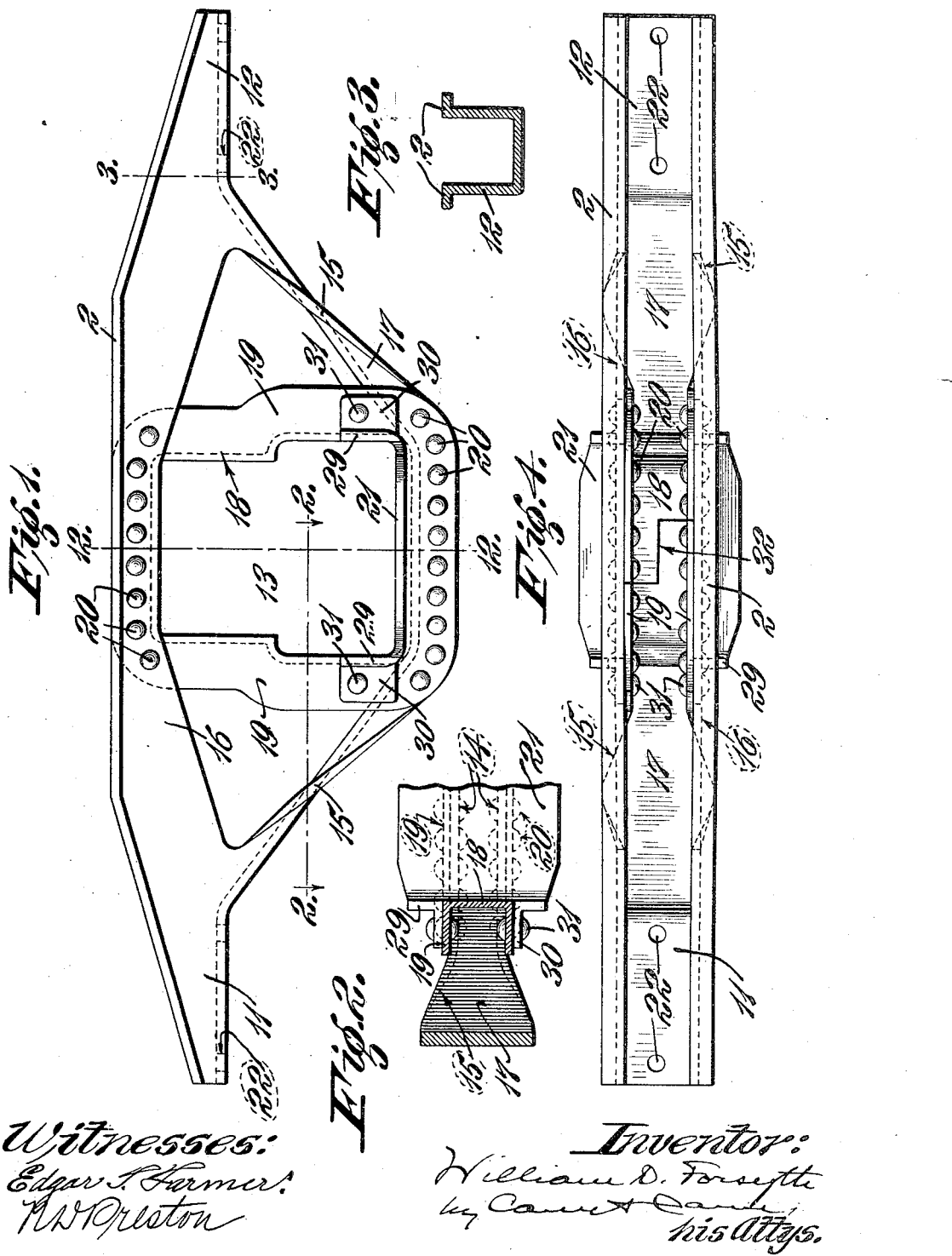

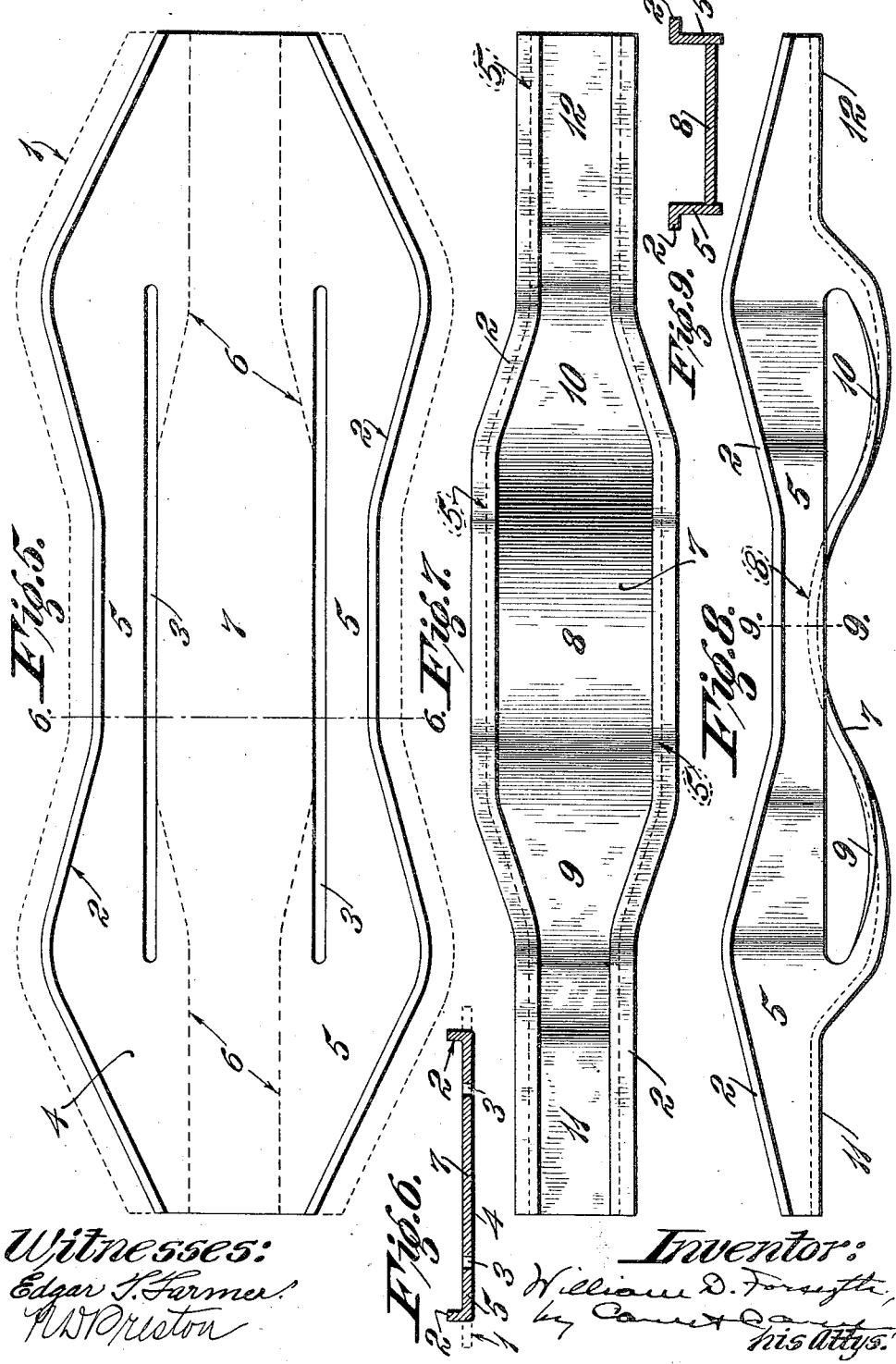
W. D. FORSYTH.
METHOD OF MAKING CAR PARTS.
APPLICATION FILED JUNE 1, 1914.
1,125,296. Patented Jan. 19, 1915.
6 SHEETS—SHEET 2.

W. D. FORSYTH.
METHOD OF MAKING CAR PARTS.
APPLICATION FILED JUNE 1, 1914.
1,125,296.
Patented Jan. 19, 1915.
6 SHEETS—SHEET 3.
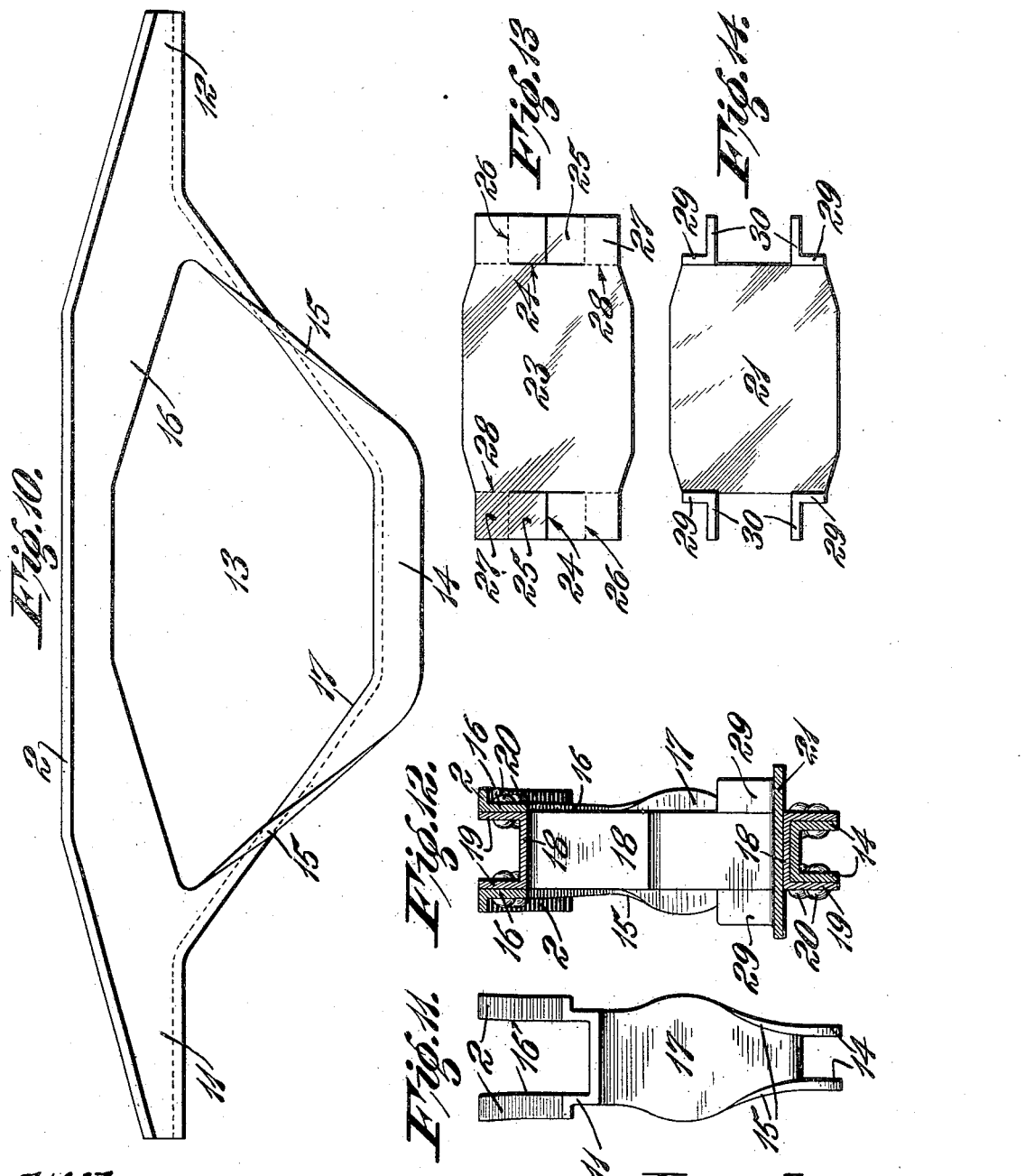

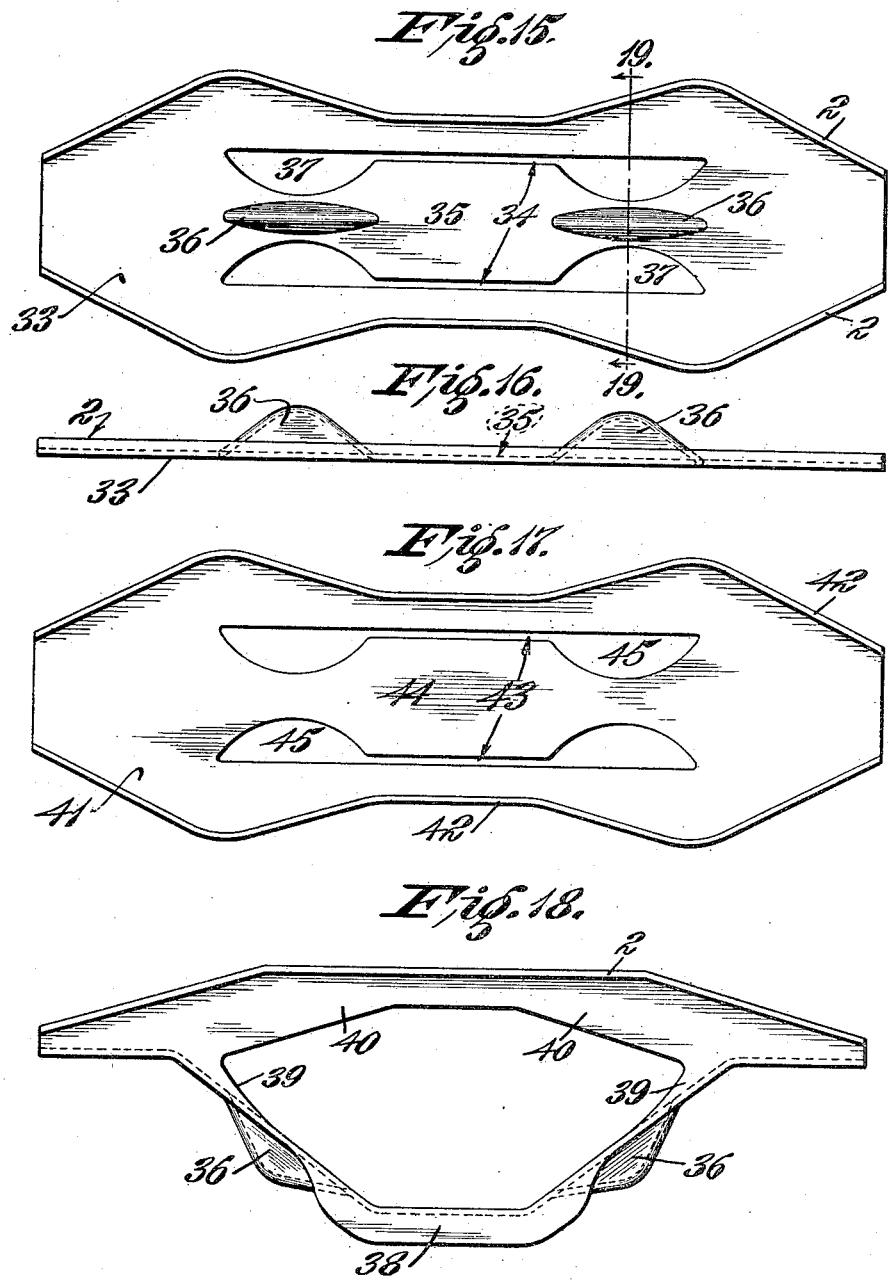

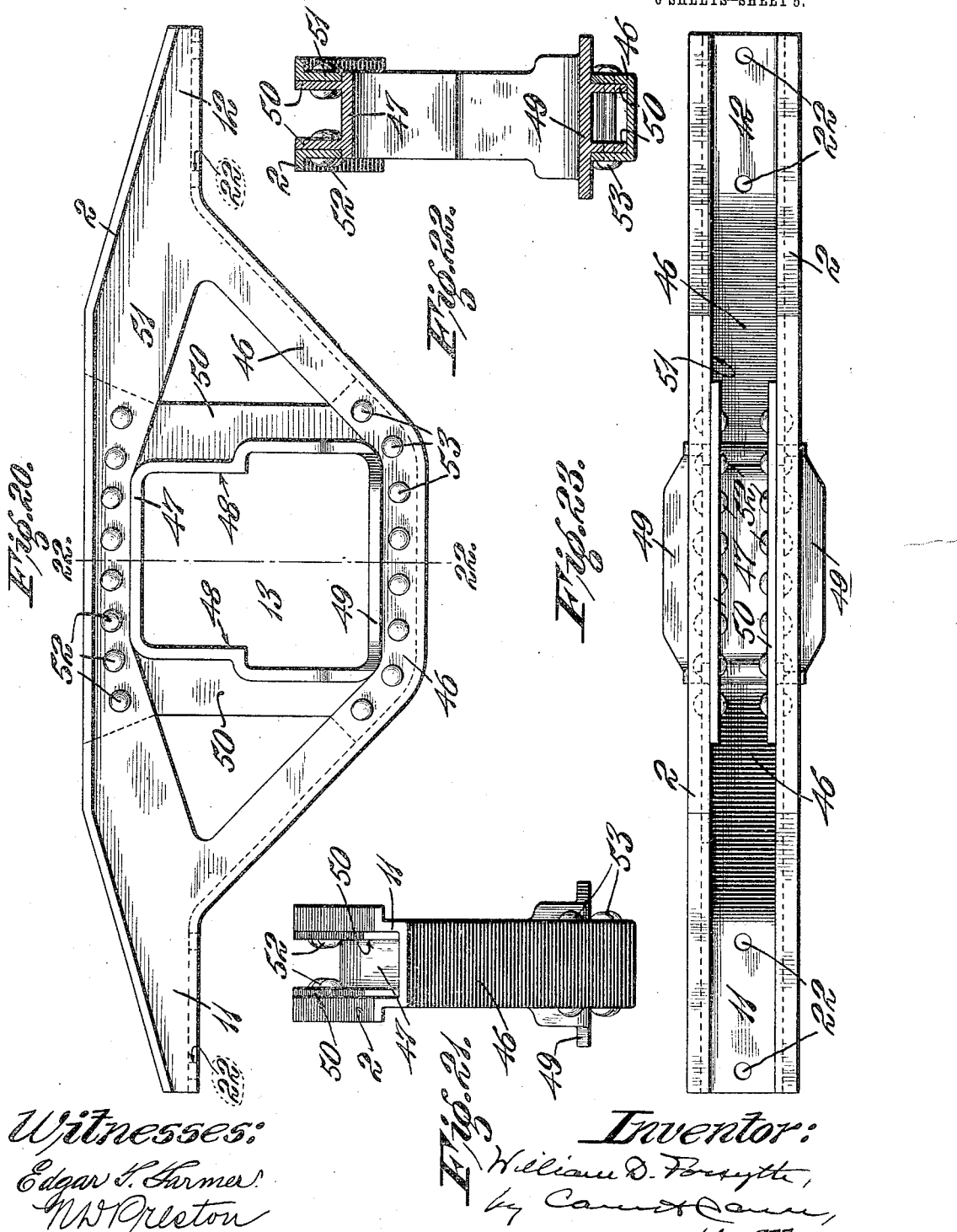

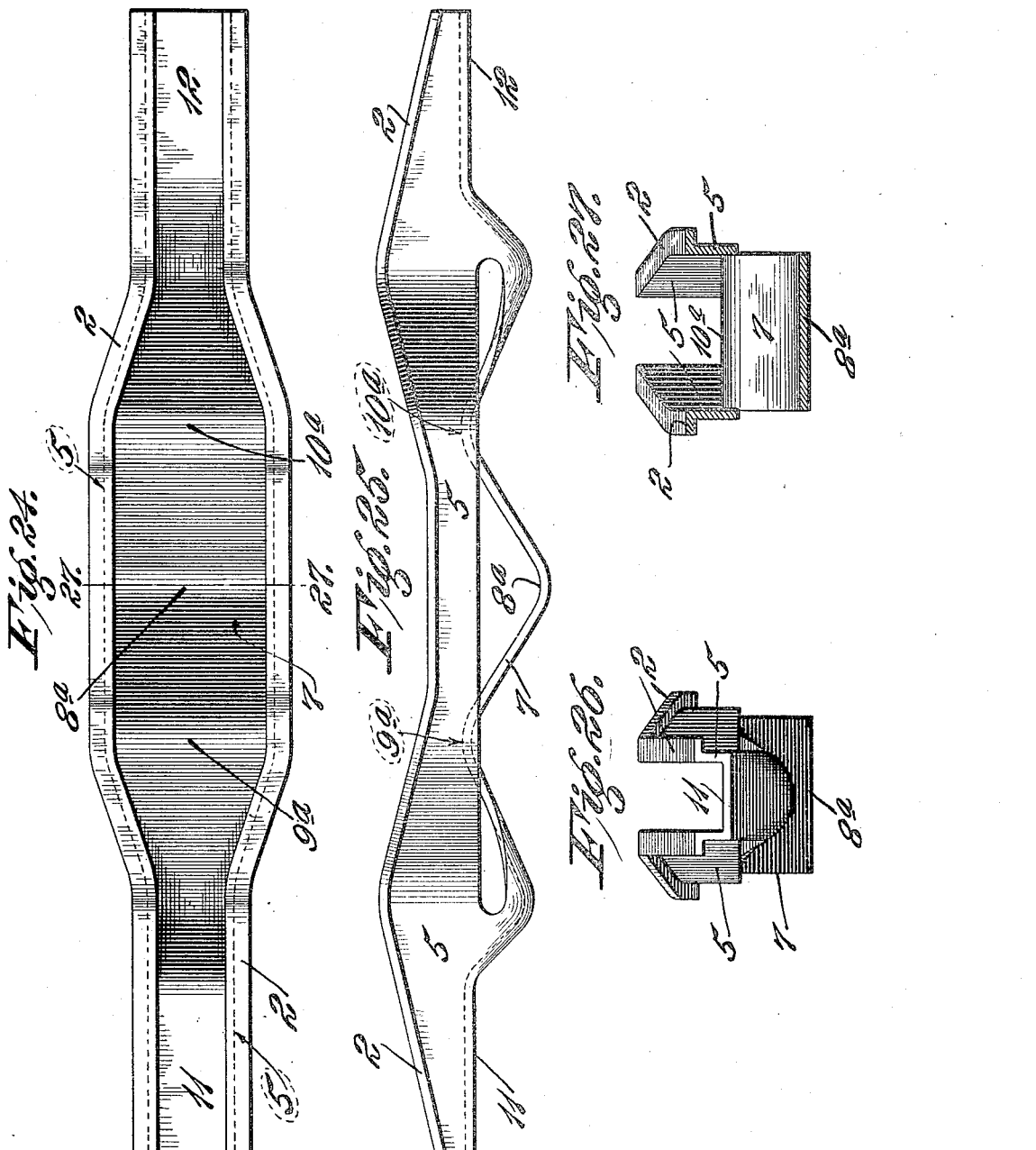

UNITED STATES PATENT OFFICE.

WILLIAM D. FORSYTH, OF YOUNGSTOWN, OHIO, ASSIGNOR TO RAILWAY PRODUCTS CORPORATION, OF BUFFALO, NEW YORK, A CORPORATION OF NEW YORK.

METHOD OF MAKING CAR PARTS.

1,125,296.   Specification of Letters Patent.   Patented Jan. 19, 1915.

Application filed June 1, 1914.   Serial No. 842,153.

*To all whom it may concern:*

Be it known that I, WILLIAM D. FORSYTH, a citizen of the United States, and a resident of the city of Youngstown, in the county of Mahoning and State of Ohio, have invented certain new and useful Improvements in Methods of Making Car Parts, of which the following is a specification.

My invention relates to the construction of parts of railway cars, and particularly to car truck side frames.

The principal object of my invention is to provide a method of making a car part from a metal plate which will be easy and cheap to practice and which will produce a light and strong car part.

In the accompanying drawings, which form part of this specification, and in which like reference characters refer to like parts throughout the several views, Figure 1 is a side elevation of a car truck side frame constructed according to my invention; Fig. 2 is a section on the line 2—2 on Fig. 1; Fig. 3 is a cross-section on the line 3—3 on Fig. 1; Fig. 4 is a top plan view of the car truck side frame shown in Fig. 1; Fig. 5 is a plan view of the blank from which the side frame shown in Fig. 1 is made, showing the blank after its longitudinal edges have been flanged and it has been slotted; Fig. 6 is a cross-section on the line 6—6 on Fig. 5; Fig. 7 is a plan view of the blank shown in Fig. 5 after the side portions thereof have been bent and the middle portion thereof has been stretched; Fig. 8 is a side view of the blank in the form shown in Fig. 7; Fig. 9 is a cross-section on the line 9—9 on Fig. 8; Fig. 10 is a side elevation of the blank in its finished shape; Fig. 11 is an end elevation of the blank in its finished shape as shown in Fig. 10; Fig. 12 is a vertical section of the completed side frame on the line 12—12 on Fig. 1; Fig. 13 is a plan view of the blank from which the plate for the spring seat is made; Fig. 14 is a plan view of the blank shown in Fig. 13 after it has been bent to form the finished plate for the spring seat; Fig. 15 is a plan view of a modified form of blank for making a car truck side frame; Fig. 16 is a side elevation of the blank shown in Fig. 15; Fig. 17 is a plan view of another modified form of blank; Fig. 18 is a side elevation of the blank shown in Figs. 15 and 16 in its finished shape; Fig. 19 is a section on the line 19—19 on Fig. 15; Fig. 20 is a modified form of the finished car truck side frame; Fig. 21 is an end elevation of the side frame shown in Fig. 20; Fig. 22 is a vertical section on the line 22—22 on Fig. 20; Fig. 23 is a top plan view of the side frame shown in Fig. 20; Fig. 24 is a plan view of the blank shown in Fig. 5 after the side portions thereof have been bent and the middle portion thereof has been stretched, showing a modified form of bending said middle portion; Fig. 25 is a side view of the blank in the form shown in Fig. 24. Fig. 26 is an end elevation of the blank in the form shown in Fig. 24; and Fig. 27 is a section on the line 27—27 on Fig. 24.

The blank for making the car truck side frame shown in Fig. 1 is made from a rectangular metal plate 1. The longitudinal edge portions of the metal plate 1 are cut off at the ends and middle regions, leaving the plate 1 of full width approximately midway between the middle and each end thereof and comparatively narrow at its middle and ends, as indicated by the dotted lines in Fig. 5. The longitudinal edge portions of the blank thus trimmed are then bent up to form flanges 2. In the plate 1 are cut parallel slots 3 which extend longitudinally of the plate and terminate short of its ends. The slots 3 may be cut in the plate 1 at the same time that the flanges 2 are formed, but in order to prevent the flanging operation from spreading the sides of the slots 3, it is preferable to cut the slots after the plate has been flanged. The plate 1 now has the form of a blank 4, as shown in full lines in Fig. 5. The blank 4 is placed in a suitable press or other machine and its two side portions 5 are bent down so as to form a channel in which the flanges 2 point in opposite directions. The bending is effected along offset lines 6 which are equally distant from the longitudinal median line of the blank 4. The middle portions of the lines 6 coincide with the slots 3 while the end portions of said lines 6 are closer together and are connected to said slots 3 by an obliquely inclined portion, whose other end is slightly inwardly from the line of greatest width of the blank. In the operation of bending the marginal portions or in a subsequent operation, the middle portion 7 of the blank 4, that is, the portion between the slots 3, is stretched by bending it sinusoidally. One way of bending said middle portion 7 is shown in Figs. 7 and 8, in which the middle longitudinal part 8 of said middle portion 7 arches up and its end longitudinal parts 9 and 10 arch down. Another way of bending said middle portion 7 is shown in Figs. 24 and 25, in which the longitudinal middle part 8ª of said middle portion 7 arches down and its end longitudinal parts 9ª and 10ª arch up. The end portions 11 and 12 of the blank 4 after it has been bent into a channel are of the same width and shape as in the finished side frame; but throughout the middle region of the blank the side portions 5 are spaced farther apart than in the finished side frame so that the middle portion 7 may pass between them. The blank 4, after it has been bent into a channel, has the side portions 5 displaced from the plane of the end portions 11 and 12 in one direction, and the middle portion 7 displaced from said plane in the opposite direction so that an opening 13 substantially hexagonal in shape is formed, as shown in Fig. 10. The opening 13 is made hexagonal to give the preferable shape to the car truck side frame, but the opening may be of any shape, provided the middle parts of the side portions 5 and the middle portion 7 are spaced apart. The marginal portions of the middle portion 7 for a part of its length at its middle are bent down to form flanges 14, and as a result of this bending, the marginal portions of the end portions of said middle portion are twisted through an angle of approximately 180 degrees, as indicated by the numeral 15. The finished car truck side frame has its compression member 16 composed of the side portions 5, and its tension member 17 composed of the middle portion 7, together with its flanges 14. An open frame 18 having sides 19, acting as bolster guide bars, is fitted in the opening 13 between the compression member 16 and the tension member 17 and is fastened by rivets 20 to the middle portion of said compression member 16 and to the flanges 14 of the tension member 17. A plate 21 is fastened in the bottom of the open frame 18 to constitute a spring seat. The journal boxes, not shown, are secured to the end portions 11 and 12 by bolts passing through holes 22 therein. The brake hanger brackets and other accessory parts of a car truck side frame are bolted or riveted to the compression member 16 or the tension member 17 at the desired points. The plate 21 constituting the spring seat is preferably made from a rectangular metal plate 23, shown in Fig. 13. The plate 23 has in each end portion a T-shaped slit 24. The portions 25 at each end of the plate 23 bordered by the slits 24 are bent down on lines parallel to the longitudinal edges of the plate 23, as indicated by the dotted lines 26, at right angles to said plate 23. Each of the corner portions 27 of said plate 23 are bent up along parallel lines extending transversely of the plate 23, as indicated by the dotted lines 28, at right angles to said plate 23. The bending of the plate 23, as described, forms at each corner of the plate 23 an integral ear 29 having thereon a flange 30. When the plate 21, made as described, is in position in the open frame 18, the flanges 30 are fastened by rivets 31 to the sides 19 of said open frame 18, and the ears 29 constitute continuations of the inside faces of said sides 19. The open frame 18 is preferably made from a metal plate by bending the plate into a channel, and then bending the channel along transverse lines into an open frame. The ends of the channel are cut and overlapped, as indicated by the line 32 on Fig. 4, and are preferably welded together.

The modified form of blank 33 shown in Figs. 15 and 16 has the same shape and the same flanges 2 along its longitudinal edges as the blank 4 has. In said blank 33 are cut parallel slots 34 which extend longitudinally thereof and which terminate short of its ends. The middle portion 35 of the blank 33, that is, the portion bordered by the slots 34, is pressed out to form a boss 36, which extends for part way along said middle portion at each end thereof. By pressing out parts of the blank 33, as described, the inner edges of the slots 34 at each end of the middle portion 35 are drawn toward each other; and the bosses 36 are shaped to curve these inner edges and form segmental openings 37. The middle portion 35 is then stretched and displaced in the same way as hereinbefore described, as shown in Fig. 18. The marginal portions of the middle portion 35 between the bosses 36 are bent down at right angles to said middle portion to form flanges 38. The marginal portions of the middle portion 35 at the ends of the slots 34 are bent up to form flanges 39, whose ends merge into the compression members 40. In this construction, the marginal portions of the middle portion 35 are not twisted as in the preferred form of construction.

In another form of blank, shown in Fig. 17, a blank 41 having flanges 42 and slots 43 is made in the same way as the preferred form of blank 4. The portions of the middle portion 44, that is, the portion bordered by the slots 43, at each end of said slots 43 are cut away to form segmental openings 45. The middle portion 44 of the blank 41 is stretched and displaced in the same manner as hereinbefore described.

While it is preferable to have the flanges 14 of the tension member 17 extend downwardly away from the bolster opening 13, it is practicable to have them extend upwardly toward the bolster opening 13, as shown in Figs. 20 and 23. This last-mentioned form of construction is made from the blank 4 shown in Fig. 5 by the same operations of stretching and bending as hereinbefore described; but the marginal portions of the middle portion 7 are bent up instead of down, and consequently the flanges 46 extend upwardly toward the bolster opening 13. In the last-mentioned form of construction, the bolster guide frame is preferably slightly modified; and while it may be made of a plate as before described, it is shown as a casting 47 having bolster guides 48 and a spring seat 49. Extending around the body of the casting 47 are two spaced flanges 50 which fit between the compression members 51 and between the flanges 46. These flanges 50 are fastened to the compression members 51 by rivets 52, and to the flanges 46 by through rivets of bolts 53.

In the car truck side frame shown, the tension member and compression member are made from plates and are integral. Where the compression and tension members join, the metal is in substantially the same condition as it was in the original plate, and consequently, these members are more strongly connected than if they were made from separate pieces riveted or otherwise fastened together. The compression members 16 are stiffened by the flanges 2, and the tension member 17 is strengthened by the flanges 14. The plate 1 may be shaped, cut and bent in any desired way so that the metal may be distributed throughout the side frame. The greatest stress in a car truck side frame exists at the point where the compression and tension members join; and the shape of the blank and the manner of bending it have been designed in the particular construction shown and described so that the amount of metal is greatest at this point. In other truss constructions, such as brake beams, truck bolsters, and the like, there may be other conditions which would cause the greatest stress to be at some other point or points; but the changes required to obtain the necessary amount of metal at these points could be easily made.

While have illustrated and described the making of a car truck side frame according to my invention, other car parts may be made according to my invention.

What I claim is:

1. A blank for making a car part comprising a flat metal plate flanged along its longitudinal edges and having therein two parallel slots extending longitudinally thereof and terminating short of its ends, the width of said blank varying at different points proportionately to the estimated stresses at those points.

2. A blank for making a car part comprising a metal plate flanged along its longitudinal edges and having therein two parallel slots extending longitudinally thereof and terminating short of its ends, said blank being widest near each end of said slots.

3. A blank for making a car part comprising a metal plate bent into a channel, the middle regions of the sides of said channel being farther apart than the ends thereof, and said blank having longitudinal slots terminating short of its ends and separating the middle portion of the bottom of said channel from said sides.

4. A blank for making a car part comprising a metal plate bent into a channel, the middle regions of the sides of said channel being farther apart than the ends thereof, and said blank having longitudinal slots terminating short of its ends and separating the middle portion of the bottom of said channel from said sides, the separated portion of said bottom being sinusoidal lengthwise.

5. The improvement in the method of making car parts which consists in cutting in a plate spaced slots extending longitudinally thereof and terminating short of its ends, bending the longitudinal side portions of said plate to form a channel, bending the portion of said plate bordered by said slots in a sinusoidal curve to stretch it longitudinally, and then displacing said last-mentioned portion so that its middle region is offset from but substantially parallel with the original plane thereof.

6. The improvement in the method of making car parts which consists in flanging the longitudinal edges of a metal plate, cutting slots in said plate extending longitudinally thereof and terminating short of its ends, bending the longitudinal side portions of said plate to form a channel, the middle regions of said side portions being as far apart as said slots, bending the portion of said plate bordered by said slots in a sinusoidal curve to stretch it longitudinally, and then displacing the last-mentioned portion from said side portions to form an opening, said opening extending more in one direction from the plane of the end portions of said plate than in the other direction from said plane.

7. The improvement in the method of making car parts which consists in cutting slots in a metal plate extending longitudinally thereof and terminating short of its ends, bending the longitudinal side portions of said plate to form a channel, bending the portion of said plate bordered by said slots in a sinusoidal curve to stretch it longitudinally, and then displacing the middle portion of said plate between said slots from said side portions of said plate in a direction perpendicular to the original plane of said middle portion, said last-mentioned middle portion of said plate being longer than said slots.

8. The improvement in the method of making car parts which consists in cutting spaced slots in a metal plate extending longitudinally thereof and terminating short of its ends, bending the longitudinal side portions of said plate to form a channel, then displacing the middle portion of said plate between said slots from said side portions in a direction perpendicular to the original plane of said middle portion, said middle portion of said plate being longer than said slots.

9. The improvement in the method of making car parts which consists in cutting a blank to form two spaced strips integral for a portion of their length at each end with the ends of a strip lying between them, bending said strip sinusoidally to stretch it longitudinally, and then displacing said strip from said spaced strips so that its middle region is apart from but substantially parallel with the original plane thereof.

10. The improvement in the method of making car parts which consists in cutting a blank to form two spaced strips integral for a portion of their length at each end with a strip lying between them, bending said strip sinusoidally to stretch it longitudinally, displacing said strip from said spaced strips so that its middle region is apart from but substantially parallel with the original plane thereof, and bending the marginal portions of said strip to form flanges thereon.

11. The improvement in the method of making car parts which consists in cutting spaced slots in a metal plate extending longitudinally thereof and terminating short of its ends, bending the longitudinal side portions of said plate to form a channel, bending the middle portion of said plate bordered by said slots sinusoidally to stretch it longitudinally, displacing said middle portion of said plate perpendicularly to the original plane thereof, and bending the marginal portions of said strip to form flanges thereon.

12. The improvement in the method of making car parts which consists in cutting parallel slots in a metal plate extending longitudinally thereof and terminating short of its ends, bending the side portions of said plate to form a channel, the middle regions of the side portions of said channel being farther apart than the ends thereof, stretching the middle portion of the bottom of said channel consisting of that part of said plate bordered by said slots, displacing said middle portion of said bottom from said side portions in a direction perpendicular to the original plane of said middle portion, and simultaneously bending the marginal portions of the middle region of said middle part to form flanges thereon projecting away from said side portions.

13. The improvement in the method of making car parts which consists in cutting parallel slots in a metal plate extending longitudinally thereof and terminating short of its ends, pressing out the portions of said plate between said slots near the ends of said slots to draw the inner edges of the ends of said slots toward each other, bending the side portions of said plate to form a channel, and then displacing the middle portion of said plate bordered by said slots from said side portions of said plate in a direction perpendicular to the original plane of said middle portion, and bending the marginal portions of said middle portion to form flanges thereon.

14. The improvement in the method of making car parts which consists in cutting spaced slots in a metal plate, said slots extending longitudinally thereof and terminating short of its ends, bending the middle portion of said plate bordered by said slots sinusoidally to stretch it longitudinally, displacing said middle portion from the plane thereof in a direction perpendicular to said plane of said middle portion, and twisting the edge portions of said middle portion to form flanges along the middle region thereof, said flanges projecting away from the remainder of said plate.

Signed at St. Louis, Missouri, this 28th day of May, 1914.

WILLIAM D. FORSYTH.

Witnesses:
 NEIL D. PRESTON,
 MARTHA A. SHELTON.

Copies of this patent may be obtained for five cents each, by addressing the "Commissioner of Patents, Washington, D. C."